May 10, 1966 K. KIRBY ETAL 3,250,152
METHOD OF AND APPARATUS FOR CREASING AND/OR CUTTING CARDBOARD
AND ANALOGOUS FLEXIBLE SHEET MATERIAL
Original Filed Aug. 2, 1961 2 Sheets-Sheet 1
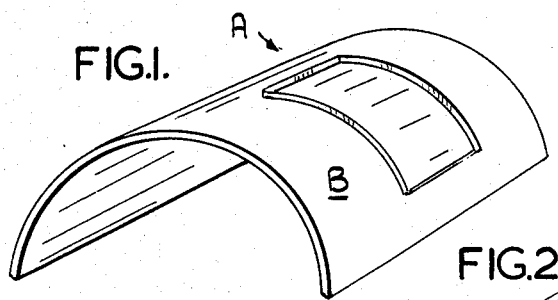
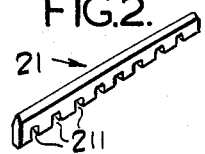
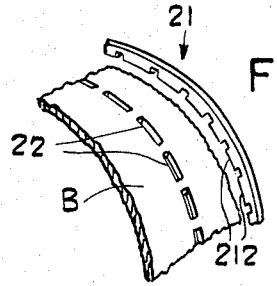
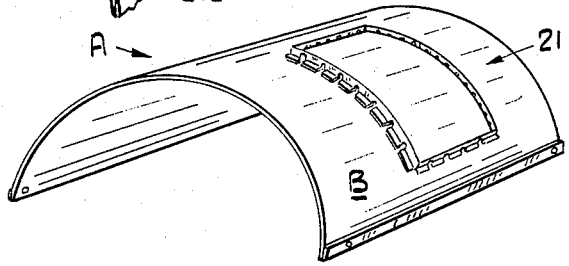
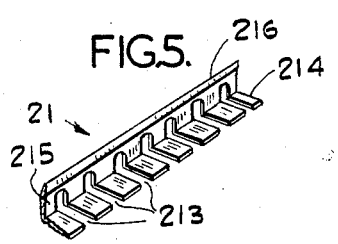
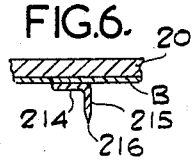

May 10, 1966 K. KIRBY ETAL 3,250,152
METHOD OF AND APPARATUS FOR CREASING AND/OR CUTTING CARDBOARD
AND ANALOGOUS FLEXIBLE SHEET MATERIAL
Original Filed Aug. 2, 1961 2 Sheets-Sheet 2
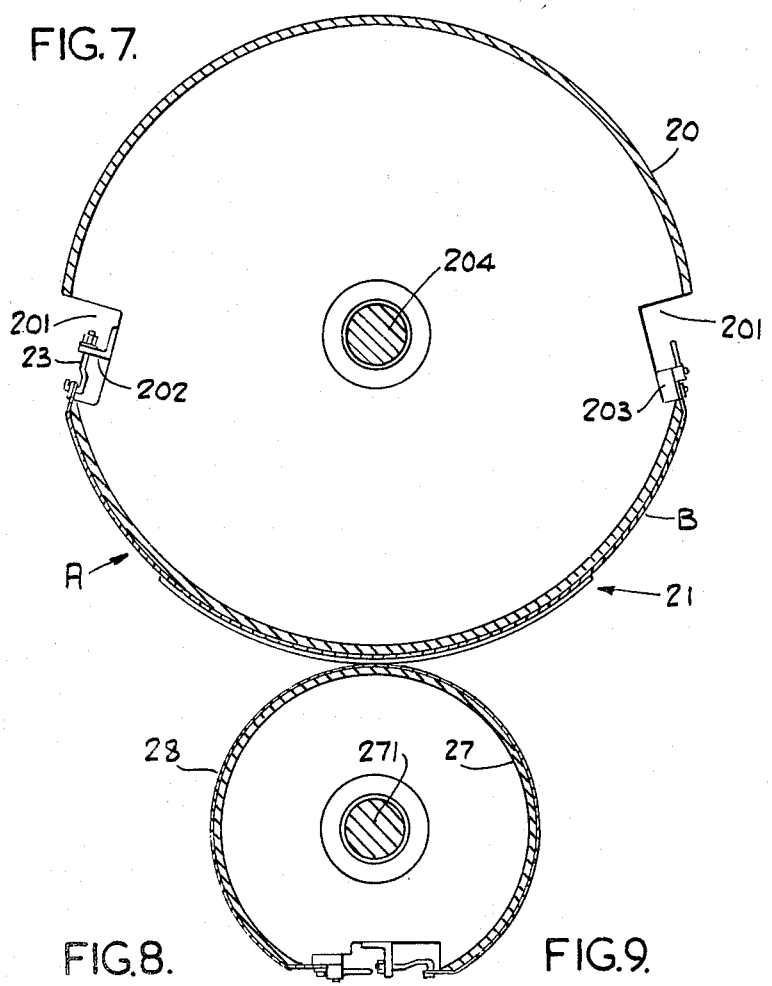
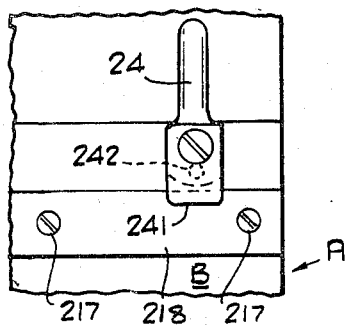
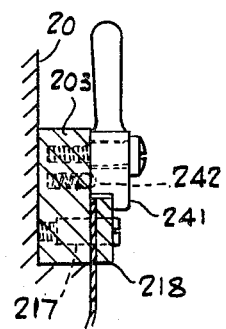

United States Patent Office 3,250,152
Patented May 10, 1966

3,250,152
METHOD OF AND APPARATUS FOR CREASING AND/OR CUTTING CARDBOARD AND ANALOGOUS FLEXIBLE SHEET MATERIAL
Kenneth Kirby, Keith Roland Tallett Kirby, and Colin Walter Kirby, all of Walsall, England, assignors to Kirby's (Engineers) Limited, Walsall, England, a corporation of Great Britain and Northern Ireland
Continuation of application Ser. No. 128,805, Aug. 2, 1961. This application June 23, 1965, Ser. No. 475,624
5 Claims. (Cl. 76—107)

This invention has reference to an improved method of making an arcuate apparatus for creasing and/or cutting cardboard and analogous flexible sheet material. The application is filed as a continuation of our co-pending application Serial No. 128,805, filed August 2, 1961, now abandoned.

According to conventional practice the creasing and/or cutting of cardboard and analogous flexible sheet material is performed in a press with the aid of formes which are constituted by flat sheets of plywood having set therein lengths of creasing or cutting rule arranged to correspond to the contour of the desired creasing and/or cutting.

The present invention has for its primary object to provide an improved method of fabricating formes for use in apparatus for creasing and/or cutting cardboard and analogous flexible sheet material which enables cardboard and analogous flexible sheet material to be creased and/or cut at a faster rate than is possible with the conventional practice aforesaid and thereby making for economy of production.

Accordingly the invention resides in an improved method of creasing and/or cutting cardboard and analogous flexible sheet material which resides in fabricating a forme of arcuate section and setting therein lengths of rule pre-curved to the contour of the desired lines of creasing and/or severance, mounting a forme so produced concentrically on a roller adapted to be positively driven, providing a second roller to constitute an impression roller and feeding the cardboard blank to be creased and/or cut between the nip of the forme carrying roller and the impression roller whereby on rotation of the rollers the cardboard blank is creased and/or cut as required.

The invention also resides in the method of fabricating forms for creasing and/or cutting cardboard and analogous flexible sheet material substantially as will be described hereinafter.

A manner of carrying the invention into effect will now be described with particular reference to the accompanying drawings wherein the apparatus depicted is intended more specifically for the creasing and/or cutting of corrugated cardboard.

In the drawings—

FIG. 1 is a perspective view of a forme in accordance with the invention based on plywood.

FIG. 2 is a fragmentary view in perspective of a length of steel creasing or cutting rule constituting the creasing or cutting medium for the plywood forme as illustrated in FIG. 1, FIG. 3 is a fragmentary view in perspective illustrating the method of fixing the creasing or cutting rule in the forme as illustrated in FIG. 1, FIG. 4 is a perspective view of a forme in accordance with the invention based on sheet metal, FIG. 5 is a fragmentary view in perspective of a length of steel creasing or cutting rule constituting the basis of the cutting or creasing medium for a steel forme as illustrated in FIG. 4, FIG. 6 is a fragmentary view in section illustrating the manner of attaching the lengths of steel creasing or cutting rule as in FIG. 5 to the sheet metal forme as illustrated in FIG. 4, FIG. 7 is a diagrammatic view on an enlarged scale illustrative of the basis of a machine for creasing and/or cutting cardboard utilizing a forme in accordance with the invention and illustrating also the method of fixing the forme to the forme carrying roller, FIG. 8 is a fragmentary view in front elevation and on an enlarged scale illustrating the manner of securing one end of the forme to the forme carrying roller, FIG. 9 is a fragmentary view partly in side elevation and partly in section and also on an enlarged scale illustrating the manner of securing one end of the forme to the forme carrying roller according to the arrangement seen in FIG. 8.

In the drawings like numerals of reference indicate similar parts in the several views.

Referring first to FIGS. 1 to 9, the forme designated generically by the reference letter "A" in FIGS. 1 and 4 is formed from a sheet of plywood B which is pre-shaped to fit on the circumference of the forme carrying roller 20 to which it is to be applied as will be described in greater detail hereinafter.

The conventional lengths of steel rule designated generically by the reference numeral 21 which are to constitute the creasing or cutting media are slotted as at 211 to assist in bending in the case where arcuate lengths are required and also to permit of the setting of the lengths or rule in the plywood base as seen in FIGS. 1 and 3.

For the purpose of setting the rule 21 in the plywood forme A of FIG. 1, the plywood is slit as at 22 by a fretsaw and the protuberant portions 212 resulting from the slotting of the lengths of rule pushed into the slits 22, see FIG. 3.

As illustrated in FIGS. 4, 5 and 6 the forme A is based on a backing B of a sheet of alloy steel conveniently of 16 standard wire gauge (British) or thereabouts which is bent to conform to the periphery of the forme carrying roller 20 to which it is to be applied.

The lengths of steel rule 21 which are to be associated with the backing B are formed from a length of strip material conveniently of alloy steel and of 16 standard wire gauge (British) or thereabouts which is bent to an angle section as seen in FIG. 5 and slotted as at 213 to facilitate bending where this is required. The rule is thus pre-curved, as shown in FIG. 3, to correspond to the arcuate curvature of the base B.

The base flanges 214 of the length or lengths of steel rule 21 may conveniently be of ⅜″ while the upstanding limb 215 may be of like height and provided with the customary pointed creasing or cutting edge 216.

After bending the sheet metal forme of FIG. 4 to fit the forme carrying roller 20 the bent backing B is superposed on a jig and the length or lengths of steel rule 21 secured to the forme by spot welding the base flange or flanges 214 to the arcuate backing after the rule has been cut off to the required dimensions and located at the appropriate positions.

The complete forme A is rigidly attached to the forme carrying roller 20 by engaging eyes along one end of the forme with hook bolts 23 which are carried by brackets 202 housed in recesses 201 in the forme roller 20. The other end is attached to the forme carrying roller 20 by means of screw pegs 217 in conjunction with a clamping strip 218, said screw pegs 217 being engageable within holes in a block 203 in the forme carrying roller 20. The clamping strip 218 may be locked in position by the bosses 241 of a plurality of levers 24 each fulcrumed on said block 203. The levers 24 are retained when in the locking position by spring pressed balls 242 which engage within recesses in the bosses 241 in a manner well understood. The levers 24 are housed in recesses 202 in the forme carrying roller 200 which are opposite to the recesses 201 aforesaid.

It will be understood that by manipulation of the levers 24 a forme may be locked to the forme carrying roller 20 or released therefrom as may be desired.

It will be understood that formes may be changed as required and likewise also the sheath of the impression roller.

Conveniently the sheath 28 for the impression roller 27 is removed after the termination of a sequence of creasing operations and is renewed when a new forme is to be employed.

If the machine is required to effect severance of the sheets of cardboard, the steel rule in the forme of the forme carrying roller may be set appropriately.

Moreover if desired provision may be made for simultaneous creasing or cutting in which event the cutting rule is made of a greater effective depth than the creasing rule.

It will be appreciated that the interchangeability of the forme with respect to the roller enables a higher rate and variety of production to be achieved than is obtainable with existent practice thereby making for economy in production.

It will be appreciated also that the invention is capable of dealing both with solid and corrugated cardboard and with analogous flexible sheet material such for example as the materials known as corrugated container board and flexible composite cork sheeting.

Further it will be appreciated that the acruate forme may be made of a material other than plywood and sheet metal for example a synthetic plastics material.

Having thus disclosed our invention we claim as new and desire to secure by Letters Patent:

1. A method of making rotary creasing or cutting apparatus, comprising the steps of preforming to arcuate shape thin flexible sheet material thus producing a forme substantially conformed to the periphery of a forme-carrying roller, fitting to the periphery of the preformed arcuate forme lengths of rule pre-curved to the arcuate contour of the forme and arranged in the desired lines of creasing or cutting and providing the arcuate forme with tensioning means applied to opposite ends of the said arcuate forme for flexing it and shaping it to a forme-carrying roller, whereby the flexible arcuate forme with the pattern of rule carried therein may be fitted to the forme-carrying roller with the forme in a continuous state of end tension and by virtue of said end tension changed in curvature as required for accurately fitting the roller, thereby making for economy by providing relatively cheap formes which can be replaced and stored after the completion of a run and brought back into re-use when the blanks are required to be creased or cut to the pattern of the replaced forme.

2. A method of making rotary arcuate creasing or cutting apparatus as described in claim 1, further characterized in that the arcuate forme is constructed of flexible plywood which is provided with slits in its periphery corresponding to the desired pattern of the line of creasing and with lengths of rule are pressed into and held within said slits.

3. A method of making rotary arcuate creasing or cutting apparatus as described in claim 1, further characterized by arranging eyes along one edge of the arcuate forme by which it may be retained on and flexed into conformity with the curvature of a forme-carrying roller.

4. A method of making rotary arcuate creasing or cutting apparatus as described in claim 1 in which the end tension is applied to the forme through the medium of hook bolts.

5. A method of making rotary arcuate creasing or cutting apparatus as claimed in claim 1 in which the end tension is applied through the medium of hook bolts and in which the tensioning means cooperates with quick action release means for facilitating detachment of the forme from the forme-carrying roller when required for storage or replacement purposes.

References Cited by the Examiner

UNITED STATES PATENTS

| | | | |
|---|---|---|---|
| 2,939,347 | 6/1960 | Tobey | 76—107 |
| 2,942,534 | 6/1960 | Boddy | 93—58.2 |
| 3,119,312 | 1/1964 | Hene | 93—58.2 |

GRANVILLE Y. CUSTER, Jr., *Primary Examiner.*